United States Patent
Hadrath

(10) Patent No.: US 10,203,079 B2
(45) Date of Patent: Feb. 12, 2019

(54) LIGHTING APPARATUS WITH CONVERSION DEVICE

(71) Applicant: OSRAM GmbH, Munich (DE)

(72) Inventor: Stefan Hadrath, Falkensee (DE)

(73) Assignee: OSRAM GMBH, Munich (DE)

( * ) Notice: Subject to any disclaimer, the term of this patent is extended or adjusted under 35 U.S.C. 154(b) by 351 days.

(21) Appl. No.: 15/118,111

(22) PCT Filed: Feb. 4, 2015

(86) PCT No.: PCT/EP2015/052288
§ 371 (c)(1),
(2) Date: Aug. 11, 2016

(87) PCT Pub. No.: WO2015/121123
PCT Pub. Date: Aug. 20, 2015

(65) Prior Publication Data
US 2017/0108190 A1 Apr. 20, 2017

(30) Foreign Application Priority Data
Feb. 17, 2014 (DE) .......................... 10 2014 202 863

(51) Int. Cl.
*F21V 7/00* (2006.01)
*F21V 8/00* (2006.01)
(Continued)

(52) U.S. Cl.
CPC ............. *F21S 41/143* (2018.01); *F21S 41/14* (2018.01); *F21S 41/16* (2018.01); *F21S 41/24* (2018.01);
(Continued)

(58) Field of Classification Search
CPC ................................ F21S 41/36; F21S 41/365
See application file for complete search history.

(56) References Cited

U.S. PATENT DOCUMENTS

| 2,993,987 A * | 7/1961 | Diffie ................... F21S 41/162 362/298 |
| 2004/0141330 A1* | 7/2004 | Takada .................. F21S 41/162 362/516 |

(Continued)

FOREIGN PATENT DOCUMENTS

| DE | 102010062460 A1 | 6/2012 |
| WO | 2009131126 A1 | 10/2009 |
| WO | 2013094590 A1 | 6/2013 |

OTHER PUBLICATIONS

International Search Report based on Application No. PCT/EP2015/052288 (4 Pages and 3 Pages of English translation) dated May 12, 2015 (Reference Purpose Only).

*Primary Examiner* — Alexander K Garlen
(74) *Attorney, Agent, or Firm* — Viering Jentschura & Partner MBB

(57) ABSTRACT

Various embodiments may relate to a lighting apparatus, including at least one primary light source for generating primary light, a reflector having two spaced-apart focal spots, a guiding optical unit disposed downstream of the at least one primary light source and serving for guiding the primary light to a first focal spot of the reflector, and a conversion device for at least partly converting the primary light into secondary light having a different wavelength which is situated at the second focal spot. The reflector has a first reflective partial region, to which the two focal spots are assigned, and a second reflective partial region, which is a partial region retroreflective for the second focal spot. The primary light emitted by the at least one primary light source is incident on the first partial region.

12 Claims, 3 Drawing Sheets

(51) Int. Cl.
  *G02B 1/11*      (2015.01)
  *F21S 41/14*     (2018.01)
  *F21S 41/16*     (2018.01)
  *F21S 41/24*     (2018.01)
  *F21S 41/33*     (2018.01)
  *F21S 41/36*     (2018.01)
  *F21S 41/143*    (2018.01)
  *F21S 41/365*    (2018.01)
  *F21Y 115/10*    (2016.01)
  *F21Y 115/30*    (2016.01)

(52) U.S. Cl.
  CPC ............ *F21S 41/331* (2018.01); *F21S 41/36* (2018.01); *F21V 7/0025* (2013.01); *F21V 7/0033* (2013.01); *G02B 1/11* (2013.01); *G02B 6/0008* (2013.01); *F21S 41/365* (2018.01); *F21Y 2115/10* (2016.08); *F21Y 2115/30* (2016.08)

(56) References Cited

U.S. PATENT DOCUMENTS

| | | | |
|---|---|---|---|
| 2005/0094402 A1* | 5/2005 | Albou | F21S 41/143 362/297 |
| 2012/0063157 A1 | 3/2012 | Nakazato et al. | |
| 2012/0294021 A1* | 11/2012 | Hessling | B64D 47/04 362/470 |
| 2013/0003400 A1 | 1/2013 | Kijima et al. | |
| 2013/0027962 A1 | 1/2013 | Takahashi et al. | |
| 2014/0022512 A1 | 1/2014 | Li et al. | |
| 2014/0347874 A1 | 11/2014 | Nakaya | |
| 2015/0124428 A1* | 5/2015 | Hadrath | G02B 19/0047 362/84 |
| 2016/0238216 A1* | 8/2016 | Oka | F21V 13/12 |

\* cited by examiner

LIGHTING APPARATUS WITH CONVERSION DEVICE

RELATED APPLICATIONS

The present application is a national stage entry according to 35 U.S.C. § 371 of PCT application No.: PCT/EP2015/052288 filed on Feb. 4, 2015, which claims priority from German application No. 10 2014 202 863.9 filed on Feb. 17, 2014, and is incorporated herein by reference in its entirety.

TECHNICAL FIELD

Various embodiments may relate to a lighting apparatus including at least one primary light source for generating primary light, a reflector having two spaced-apart focal spots, a guiding optical unit disposed downstream of the at least one primary light source and serving for guiding the primary light to a first focal spot of the reflector, and a conversion device for converting the primary light into secondary light having a different wavelength. Various embodiments are applicable in particular to the field of vehicle lighting systems, in particular exterior lighting, e.g. for generating an additional light, a daytime running light, etc.

BACKGROUND

Lighting apparatuses including light emitting diodes ("LEDs") as light sources are known which, by means of a wavelength-converting phosphor, convert blue primary light generated by the LEDs partly into yellow light and generate a blue-yellow or white mixed light. The white mixed light can be used e.g. for generating driving light functions (low beam, high beam, cornering light) of automobiles. However, the achievable luminances are comparatively low.

SUMMARY

Various embodiments aim to provide a possibility for generating wavelength-converted light with a higher luminance.

Various embodiments provide a lighting apparatus including at least one primary light source for generating primary light, a reflector having two focal spots spaced apart from one another, an optical unit (referred to as "guiding optical unit" hereinafter, without restricting the generality) disposed downstream of the at least one primary light source and serving for guiding the primary light to a first focal spot of the reflector, and a conversion device for converting the primary light into secondary light having a different wavelength, which conversion device is situated at the second focal spot. The reflector has a first reflective partial region, to which the two focal spots are assigned, and a second reflective partial region, which is a partial region retroreflective for the second focal spot. The primary light emitted by the at least one primary light source is incident on the first partial region.

This lighting apparatus has the advantage that light reflected back from the conversion device onto the second partial region of the reflector is reflected again into the conversion device and is thus utilizable again.

In one development, the primary light generated by the at least one primary light source is guided by means of the guiding optical unit to the first focal spot and coming from there impinges on the first partial region. The primary light is reflected onto the second focal spot by means of the first partial region. Since the conversion device is situated at the second focal spot, the primary light arriving there is at least partly converted into secondary light having a typically longer wavelength. From the conversion device, part of the primary light and of the secondary light can be emitted back into the reflector. If the light impinges on the second partial region of the reflector, it is reflected back again onto the conversion device. Primary light contained in the light may then be converted into secondary light; a secondary light portion may be used further e.g. as part of a useful light.

The lighting apparatus may be present as a module or, if it is equipped e.g. with electronics for operating the at least one light source, as a so-called light engine. The lighting apparatus may include at least one optical element which is disposed optically downstream of the conversion device. The at least one optical element acts on the useful light emitted by the conversion device. The at least one optical element may include for example at least one reflector, e.g. parabolic reflector, lens, diaphragm, diffuser, etc.

The primary light is preferably light having a short wavelength, e.g. blue light or UV light.

A focal spot may be understood to be, in particular, a typically small region around one focal point at which light emitted by it is reflected by the reflector into a region approximately just as small around the other focal point. In the present case, in order to avoid light losses and thus in order to increase a luminance, it is advantageous that the focal spots are dimensioned such that a light beam radiated from the first focal spot onto the reflector is reflected onto the conversion device. A beam width of the primary light beam or beam of primary light emitted by the guiding optical unit may not exceed in particular a diameter of the practically useable focal spot. A diameter of the focal spot is for example 2 mm or less, in particular 1 mm or less.

The guiding optical unit may have one or more optical elements. The guiding optical unit changes the primary light beam emitted by the at least one primary light source e.g. by deflecting the at least one primary light beam and/or limiting the width thereof. The guiding optical unit may have for this purpose at least one lens, at least one reflector, at least one light guide, at least one diffuser, at least one diaphragm, etc. The guiding optical unit may additionally or alternatively have at least one collecting optical unit, e.g. in order to combine the light beams of a plurality of light sources.

For example, given a sufficiently accurate direction and focusing of the primary light beam emitted by the at least one light source onto the first focal spot, the guiding optical unit can also be dispensed with. Particularly for this case, the first partial region of the reflector may also serve for beam expansion of the primary light beam.

The conversion device has at least one phosphor for at least partly converting the primary light. The phosphor may be e.g. a substance that converts the primary light (e.g. UV light or blue light) into green secondary light, yellow secondary light, red secondary light, IR light, etc. If the primary light is not completely converted, it can be used together with secondary light as mixed light. By way of example, non-converted blue primary light together with yellow secondary light may produce a white mixed light. An additional portion of red secondary light produces a warmer color temperature (e.g. "warm-white"), etc.

The conversion device is arranged remote from the light source, which, in the case where a laser light source is used, may also be referred to as LARP (laser activated remote phosphor). The remote arrangement of the phosphor from the light source has the advantage of an improved possibility for dissipating heat from the phosphor. In addition, in this case an area of the incident primary light can be simply enlarged, such that damage to the phosphor is prevented even more reliably.

The fact that the second partial region of the reflector is a partial region retroreflective for the second focal spot means, in particular, that light radiated from the second focal spot onto the second partial region of the reflector is reflected back into the second focal spot.

In one configuration, the first partial region and the second partial region of the reflector adjoin one another, as a result of which a large area for the second partial region can be achieved.

In one configuration, moreover, the first partial region has an elliptical basic shape. The elliptical basic shape may deviate slightly from an exact elliptical shape, without losing the functionality of the elliptical shape, e.g. the presence of two spaced-apart focal spots. The elliptical basic shape encompasses the exact elliptical shape. The elliptical basic shape has the advantage of providing two focal points in a simple manner.

In another configuration, the second partial region has a spherical basic shape. The spherical basic shape may deviate slightly from an exact spherical shape, without losing the functionality of the spherical shape. The spherical basic shape encompasses the exact spherical shape. The spherical basic shape has the advantage of being able to reflect back light beams impinging thereon from the second focal spot directly into the second focal spot again.

In a further configuration, the first partial region corresponds to an illumination region or light spot of the primary light emitted by the guiding optical unit on the reflector. As a result, an area proportion of the second partial region can be made particularly large. In other words, the first partial region is formed at the area of the reflector on which the primary light emitted by the guiding optical unit first impinges. A boundary or a transition between the first partial region and the second partial region may be present for example where an intensity of the primary light beam emitted by the guiding optical unit is not more than 10%, in particular not more than 5%, in particular not more than 2%, in particular not more than 1%, in particular not more than 0.1%, of a maximum beam intensity or a maximum brightness. In this regard, scattered radiation into a region outside the second focal spot can be kept small, in particular practically avoided. Particularly preferably, the boundary is situated where primary light radiation emitted by the guiding optical unit is precisely no longer detectable. In this case, a tolerance range can also be provided in a targeted manner, e.g. having a width of between 0.5 mm and 1 mm.

In a further configuration, the guiding optical unit has at least one light guide whose light exit surface is arranged at the first focal spot. This enables a particularly simply implementable primary light entrance into the first focal spot. In particular, a complicated light path toward the first focal spot can thus be implemented in a simple manner.

In one development, the light guide is a hollow guide, e.g. a straight or curved tube. The hollow guide may be reflectively coated in its interior.

In another development, the light guide is an optical waveguide (OWG) or an optical fiber. The light guide may consist of glass or of plastic for example.

The light guide may also be embodied as a compact (non-hollow) rod. The use of a rod has the advantage that it can be installed and positioned in a self-supporting manner and thus particularly simply and stably. A further advantage is the possibility of shaping an outer contour with little outlay. Moreover, the rod may be embodied in a flexible fashion.

In yet another configuration, the light guide is embodied as a light mixing guide. A more uniform irradiation of the conversion device is made possible as a result. A light mixing guide may be understood to be, in particular, a light guide whose light distribution at its light exit surface is more uniform than at its light entrance surface, since light mixes in it. The uniformity or homogeneity may concern in particular an intensity or brightness of the primary light, alternatively or additionally the color distribution in the case of a multicolored primary light. The light mixing guide has the further advantage that a focal point of the primary light beam at the light entrance surface need not be accurately positioned in order to bring about a uniform light distribution at the light exit surface. A significantly better tolerance insensitivity of the primary light is made possible as a result. A lower variability of the position of the luminous spot at the light exit surface in turn has the effect that a position of a primary light spot on the phosphor is also independent of the exact position of the focal point of the primary radiation at the input of the light mixing guide. In this regard, e.g. in the case of a vehicle headlight, it is possible to achieve a reduced scattering of the light distribution on the road.

Furthermore, in one configuration, the light guide has an angular cross-sectional shape. The latter generates an improved light mixing and thus higher uniformity at the light exit surface compared with a non-angular cross-sectional shape. The angular cross-sectional shape may include e.g. a rectangular, in particular square, or a hexagonal cross-sectional shape. In principle, however, non-angular cross-sectional shapes are also possible, e.g. a circular, oval or elliptical cross-sectional shape. Particularly in this configuration, the light guide may be a rod-type light guide.

The conversion device may have a transmissive construction in which wavelength-converted light and, if appropriate, primary light that passed through the conversion device can be tapped off as useful light at a side (e.g. a "rear side") of the conversion device which faces away from a side (e.g. a "front side") on which the primary light is incident. Light emitted from the front side, if it is incident on the second partial region of the reflector, can then be reflected back again and (if appropriate after a wavelength conversion) be obtained as useful light at least partly at the rear side.

The conversion device may also have a reflective construction in which wavelength-converted secondary light and, if appropriate, non-converted primary light can be tapped off as useful light within a predetermined solid angle at a side (e.g. the front side) of the conversion device, wherein the primary light is incident on the same side. Light emitted from the front side, if it is incident not in the solid angle provided for tapping off useful light, but rather on the second partial region, can then be reflected back again and (if appropriate after a wavelength conversion) be obtained as useful light at least partly.

In one configuration, moreover, the conversion device has a wavelength-converting phosphor layer. The use of a layer affords the advantage that only a low light absorption occurs therein. The phosphor layer may include one or more phosphors. The phosphor layer may be situated at least partly within the second focal spot. In order to keep internal absorption losses low and to save material and in order to achieve a good suitability for a transmissive construction, the phosphor layer has a small thickness, in particular of 1 mm or less, in particular of 0.8 mm or less, in particular of 0.5 mm or less.

In one configuration, moreover, the phosphor layer is applied on a light-transmissive carrier. A configuration of the conversion device with a transmissive construction can thus be facilitated. The carrier is present in particular as a thin lamina in order to keep light losses low.

In one development, the carrier is a sapphire carrier. The latter is light-transmissive and enables an effective heat dissipation from the phosphor on account of its high thermal conductivity. The sapphire carrier can thus also act as a heat sink. It may be connected to a heat sink and/or to a cooling source (e.g. a Peltier element).

In one configuration, in addition, the carrier is arranged in a light path of the primary light upstream of the phosphor layer. A particularly low-loss emission of the secondary light can thus be achieved. Secondary light emitted from the reflector onto the conversion device, in the case of a transmissive construction, thus firstly impinges on a light entrance region of the carrier, e.g. its front side, and then passes through it. The phosphor, in particular the phosphor layer, is arranged at a light exit region of the carrier, e.g. at its rear side. In this case, proceeding from the phosphor, reflection of primary light that has possibly not been converted but has been scattered at the phosphor in the direction of the carrier can occur. In addition, the primary light may be reflected back into the reflector by reflection at interfaces of the carrier, without entering the phosphor. Furthermore, from the phosphor layer typically a part of the secondary light generated there is emitted in the direction of the carrier and may be incident on the reflector.

Without further measures, the light reflected back from the conversion device onto the reflector would be lost at least for the most part. By virtue of the use of the reflector described above, however, that part of the reflective light which is incident on the second partial region is reflected back in the direction of the conversion device again, in particular onto the phosphor layer, and can thus be used again.

In one configuration that is advantageous for reducing light losses further and thus for increasing a luminance, the carrier is provided with a dichroic coating which is practically completely transmissive to the primary light and which practically completely reflects the secondary light. As a result, only non-converted primary light scattered at the phosphor layer is reflected by the carrier onto the reflector, while the secondary light can be coupled out completely as useful light. The dichroic coating may be embodied for example as a layer stack having alternating layers.

Furthermore, in one development, the carrier is provided with an antireflection coating in order to suppress light losses as a result of interface reflection and thus to reduce light losses (Fresnel losses) even further. The antireflection coating may be present in particular at a surface facing the reflector, e.g. at a front side of a laminar carrier, in order to be able to keep light losses as a result of interface reflection particularly low. The phosphor layer, too, may be provided with an antireflection coating.

Furthermore, in one configuration, the conversion device has a converting phosphor layer applied on a reflective carrier. Said layer is particularly suitable for a reflective construction.

In another configuration, the at least one light source includes at least one semiconductor light source. The at least one semiconductor light source may include for example at least one light emitting diode. If a plurality of light emitting diodes are present, they can emit light in the same primary color or in different primary colors. Moreover, the light emitted by the at least one light emitting diode may be an infrared light (IR LED) or an ultraviolet light (UV LED). The at least one light emitting diode may itself contain at least one wavelength-converting phosphor (conversion LED). The at least one light emitting diode may be present in the form of at least one individually packaged light emitting diode or in the form of at least one LED chip. A plurality of LED chips can be mounted on a common substrate ("submount"). The at least one light emitting diode may be equipped with at least one dedicated and/or common optical unit for beam guiding, e.g. at least one Fresnel lens, collimator, and so on. Instead or in addition to inorganic light emitting diodes, e.g. based on InGaN or AlInGaP, generally organic LEDs (OLEDs, e.g. polymer OLEDs) can also be used. Alternatively, the at least one semiconductor light source may e.g. constitute at least one laser, e.g. be a diode laser. In the case where a laser is used, the lighting apparatus may also be regarded as an LARP apparatus. However, the lighting apparatus is not restricted to semiconductor light sources and may e.g. also include other lasers.

In another configuration, the lighting apparatus constitutes a part of a vehicle lighting system. By way of example, the lighting apparatus may constitute a module or a light engine as a part of a vehicle lighting system. The vehicle lighting system may serve in particular for illuminating the surroundings or environment. The vehicle lighting system may be e.g. a headlight, for example for generating a low beam, a high beam, a fog light, an additional light and/or a cornering light, etc. The vehicle lighting system may furthermore be a daytime running luminaire, a direction indicator, a brake light, a rear light, etc.

The vehicle lighting system may be a lighting apparatus for a watercraft, an aircraft and/or a landborne vehicle. The landborne vehicle may be a motor vehicle, e.g. an automobile, a truck or a motorcycle.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
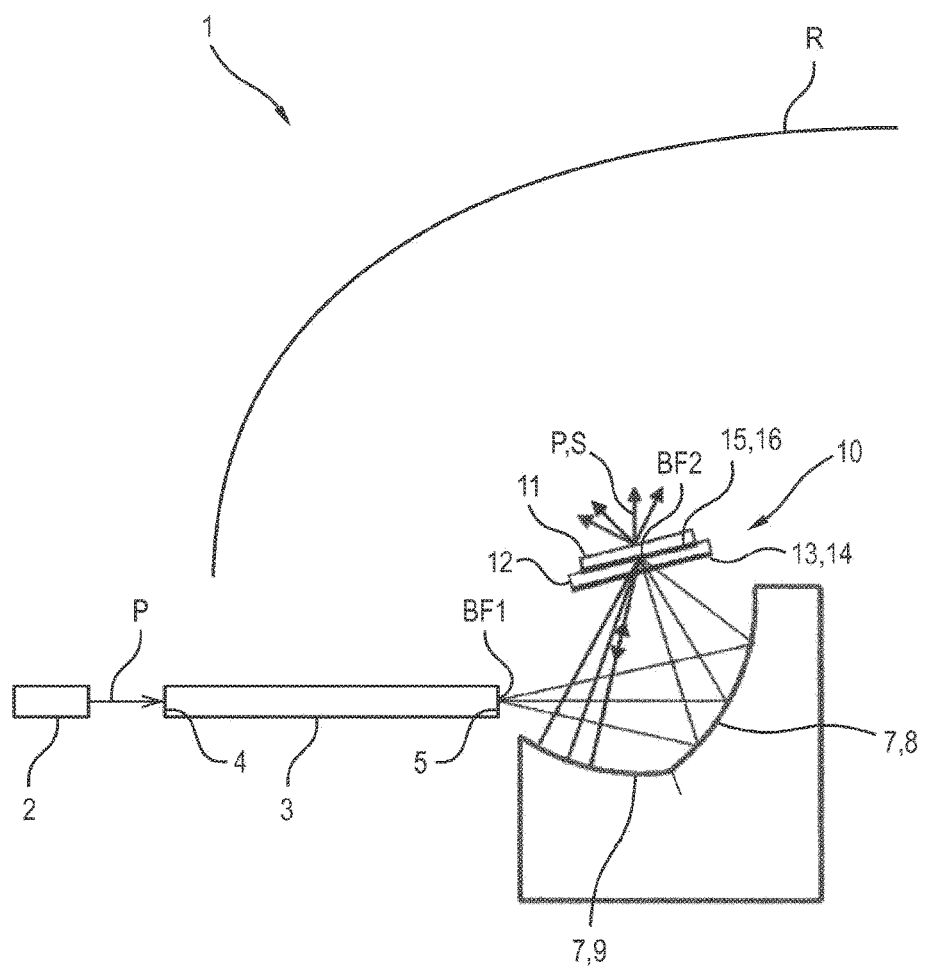
FIGS. 1 to 3 show lighting apparatus in accordance with a first, second and third embodiment, respectively, as a sectional illustration in side view.

FIG. 1 shows a lighting apparatus 1 in accordance with a first embodiment as a sectional illustration in side view. The lighting apparatus 1 includes a primary light source in the form of a laser 2, which radiates blue primary light P into a guiding optical unit. The guiding optical unit is embodied here as a light mixing guide in the form of a light mixing rod 3 composed of light-transmissive glass or plastic. A first end face 4 of the light mixing rod 3 serves as a light entrance surface for the primary light P. The primary light P passes through the light mixing rod 3 in its longitudinal direction and is mixed in the process. A light spot made more uniform in respect of its intensity arises at the second end face 5 of the light mixing rod 3, said second end face serving as a light exit surface. Said light spot is largely independent of an exact position of the primary light beam P at the first end face 3. In order to support a homogenous light spot at the second end face 5, a cross-sectional shape of the light mixing rod 3 is shaped in an angular fashion, e.g. in a rectangular or hexagonal fashion.

The second end face 5 is situated at a first focal spot BF1 (e.g. a region having a diameter of approximately 1 mm with the first focal point as midpoint) of an elliptical first partial region 8 of a reflector 7. The reflector 7 is embodied such that it is in particular specularly reflective or reflective in a mirroring fashion and thus constitutes a deflection mirror. A second focal spot BF2 of the first partial region 8 is spaced apart from the first focal spot BF1.

A second partial region 9 having a spherical basic shape is adjacent to the first partial region 8. The sole focal spot of the second partial region 9 corresponds to the second focal spot BF2 of the first partial region 8. A phosphor layer 11 of a conversion device 10 is situated at the second focal spot BF2. Primary light P emitted from the second end face 5 of the light mixing rod 3 impinges only on the first partial region 8 and not on the second partial region 9. The first partial region 8 thus corresponds to at least one illumination region of the primary light P emitted by the light mixing rod 3 on the reflector 7.

The primary light P is deflected by the first partial region 8 onto the second focal spot BF2 and in this case impinges on the conversion device 10. The conversion device 10 has a laminar, transparent carrier 12 composed of sapphire, for example, in addition to the phosphor layer 11. A front side 13 of the carrier 12 faces the reflector 7 and is covered with an antireflection layer 14. A rear side 15 of the carrier 12 is covered with a dichroic coating 16 which transmits the primary light P practically completely (i.e. completely apart from practically negligible losses).

The phosphor layer 11 is applied on the dichroic coating 16 and converts the primary light P transmitted through the dichroic coating 16 at least partly into secondary light S having a longer wavelength, e.g. into yellow secondary light. This construction corresponds to a transmissive construction. The dichroic coating 16 is configured such that it is reflective for the secondary light S, such that the latter incurs no light losses as a result of backscattering.

In particular, a phosphor may generate yellow secondary light S which, together with non-converted blue primary light P produces a yellow-blue or white mixed light P, S. The mixed light P, S can be coupled out further as useful light, e.g. by a reflector R disposed optically downstream.

The phosphor layer 11 may include as necessary two or even more phosphors which further convert the primary light P or previously converted secondary light S.

Primary light P backscattered from the phosphor layer 11 through the dichroic coating 16 onto the second partial region 9 of the reflector 7 is reflected back onto the second focal spot BF2 and can enter the phosphor layer 11 again there. In this regard, light losses are reduced further and a luminance and system efficiency are increased.

The lighting apparatus 1 may constitute e.g. a part of a vehicle headlight, e.g. for generating an additional light, a fog light, a high beam, a low beam, a cornering light, etc.

Figure 2:
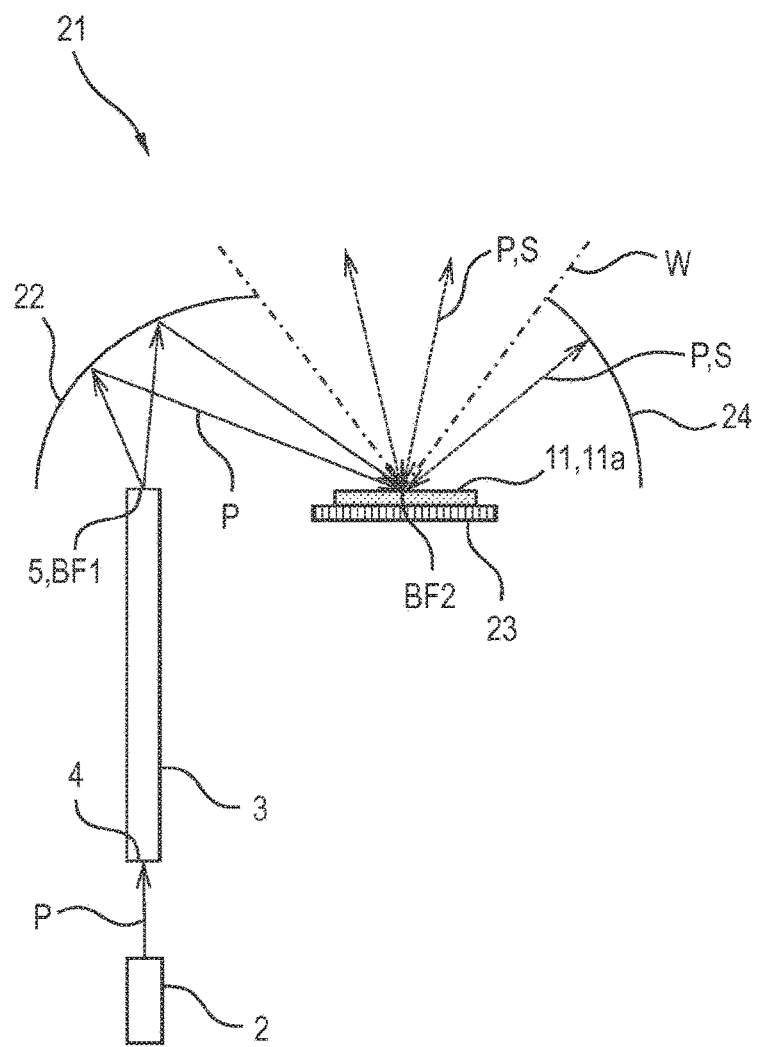

FIG. 2 shows a lighting apparatus 21 in accordance with a second embodiment as a sectional illustration in side view. The lighting apparatus 21 has a reflective construction in which primary light P reflected by a first reflective partial region 22 having an elliptical basic shape is incident directly on a phosphor layer 11, namely here on a front side 11a. The phosphor layer 11 is applied by its rear side on a reflective carrier 23 and forms with the latter a conversion device 11, 23. The carrier 23 may consist of metal, for example, in order to be able to act as an effective and inexpensive heat sink. Light (e.g. both primary light P and secondary light S) emitted by the phosphor layer 11 and impinging on the carrier 23 is reflected back into the phosphor layer 11, such that light losses are avoided at the carrier 23.

In order to avoid light losses even further, the front side 11a of the phosphor layer 11 may also be coated with an antireflection layer (not illustrated).

The mixed light P, S emitted by the phosphor layer 11 within a predetermined solid angle region W from the front side 11a can be used further as useful light. A second reflective partial region 24 having e.g. a spherical basic shape can be arranged at a solid angle region lying alongside the first reflective partial region 22 and the solid angle region W. The second partial region 24 may reflect in particular light (e.g. both primary light P and secondary light S) emitted outside the solid angle region W back onto the phosphor layer 11, from where it can be emitted again at least partly into the solid angle region W. In this regard, light losses can be reduced further in the case of a reflective construction as well.

Figure 3:
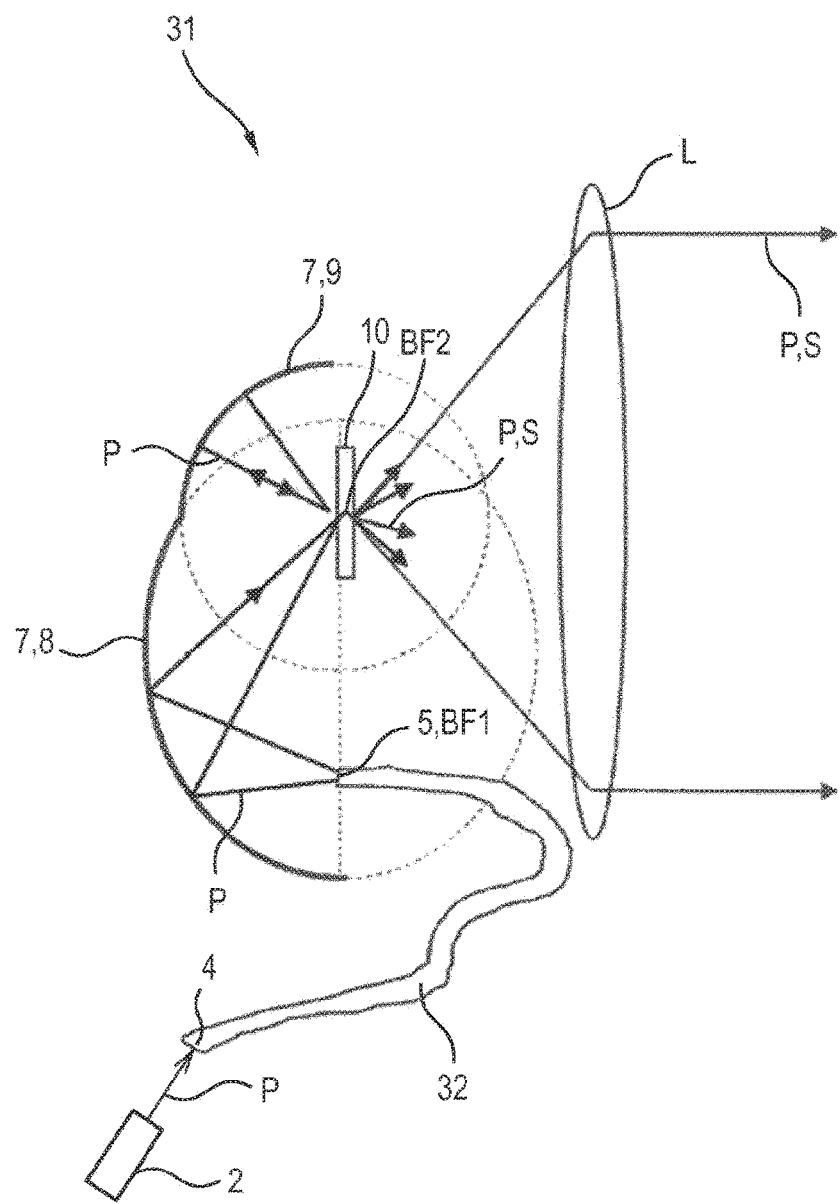

FIG. 3 shows a lighting apparatus 31 in accordance with a third embodiment as a sectional illustration in side view. The lighting apparatus 31 has a transmissive construction in a manner similar to the lighting apparatus 1. In contrast to the lighting apparatus 1, the guiding optical unit here is embodied as a light mixing guide in the form of a readily flexible optical hollow guide 32 composed of light-transmissive glass or plastic. The optical hollow guide 32 includes one or more light guiding fibers. The optical hollow guide 32 can be made particularly diversely and thereby reduces a dependence of a position of the at least one light source on a position and attainability of the first focal spot BF1.

In addition, the optical unit used for coupling out the mixed light P, S emitted as useful light by the conversion device 10 now exhibits a lens L.

The illustration furthermore shows, as a dashed line, a sectional contour of an ellipse associated with the first partial region 8 of the reflector 7 with its major semi-axis, on which lie the focal points BF1 and BF2. A sectional contour of a circle associated with the second partial region 9 of the reflector 7 is also depicted as a dashed line.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

Generally, "a(n)", "one", etc. can be understood to mean a singular or a plural, in particular in the sense of "at least one" or "one or a plurality" etc., as long as this is not explicitly excluded, e.g. by the expression "exactly one" etc. Moreover, a numerical indication can encompass exactly the indicated number and also a customary tolerance range, as long as this is not explicitly excluded.

The invention claimed is:

1. A lighting apparatus comprising:
    at least one primary light source for generating primary light,
    a reflector having two spaced-apart focal spots,
    a guiding optical unit disposed downstream of the at least one primary light source and serving for guiding the primary light to the first focal spot of the reflector, and a conversion device for at least partly converting the primary light into secondary light having a different wavelength which is situated at the second focal spot, wherein the reflector has a first reflective partial region, to which the two focal spots are assigned, and a second reflective partial region, which is a partial region retroreflective for the second focal spot, and wherein the primary light emitted by the at least one primary light source is incident on the first partial region.

2. The lighting apparatus as claimed in claim 1, wherein the first partial region has an elliptical basic shape and the second partial region has a spherical basic shape.

3. The lighting apparatus as claimed in claim 2, wherein the first partial region corresponds to an illumination region of the primary light emitted by the guiding optical unit on the reflector.

4. The lighting apparatus as claimed in claim 1, wherein the guiding optical unit has at least one light guide whose light exit surface is arranged at the first focal spot.

5. The lighting apparatus as claimed in claim 4, wherein an optical wave guide is embodied as a light mixing guide.

6. The lighting apparatus as claimed in claim 5, wherein the light guide has an angular cross-sectional shape.

7. The lighting apparatus as claimed in claim 1, wherein the conversion device has a converting phosphor layer applied on a light-transmissive carrier.

8. The lighting apparatus as claimed in claim 7, wherein the carrier is arranged in a light path of the primary light upstream of the phosphor layer, and the carrier is provided with a dichroic coating which is transmissive to the primary light and reflects the secondary light.

9. The lighting apparatus as claimed in claim 1, wherein the conversion device has a converting phosphor layer applied on a reflective carrier.

10. The lighting apparatus as claimed in claim 1, wherein the at least one light source comprises at least one semiconductor light source.

11. The lighting apparatus as claimed in claim 1, wherein the lighting apparatus constitutes a part of a vehicle lighting system.

12. The lighting apparatus as claimed in claim 1, wherein the first reflective partial region and the second reflective partial region adjoin one another.

* * * * *